May 19, 1925.

H. A. HAGEN

SCORE CARD

Filed Feb 19, 1924

1,538,697

Harry A. Hagen, INVENTOR.

BY Geo. F. Kimmel
ATTORNEY.

Patented May 19, 1925.

1,538,697

UNITED STATES PATENT OFFICE.

HARRY ANTHONY HAGEN, OF EAST DUBUQUE, ILLINOIS.

SCORE CARD.

Application filed February 19, 1924. Serial No. 693,799.

*To all whom it may concern:*

Be it known that I, HARRY ANTHONY HAGEN, a citizen of the United States, residing at Menominee, East Dubuque, in the county of Jo Daviess and State of Illinois, have invented certain new and useful Improvements in Score Cards, of which the following is a specification.

This invention relates to a score card for the scoring of points in competitive games, such as are ordinarily played with cards or other devices in which several players engage to match their wits or ability, and the invention has for its object to provide a score card, in a manner as hereinafter set forth, for not only facilitating the scoring of points of competitive games but further for providing suitable and effective means whereby the exact score or count may be tabulated without possibility of mistakes.

Further objects of the invention are to provide, in a manner as hereinafter set forth, a score card, which is simple in its construction and arrangement, compact, thoroughly efficient and convenient in its use, providing for a permanent record of the score, and inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a front elevation of a score card in accordance with this invention.

Figure 2 is a view similar to Figure 1 with the score card reversed.

Figure 3 is a longitudinal sectional view thereof.

A score card in accordance with this invention consists of a body portion A of substantial length and width and formed preferably of thin cardboard of the desired rigidity, but it is to be understood that the body portion of the score card can be made of any suitable material, and preferably the body portion A is rectangular in contour.

One end edge of the body portion A is indicated at B, and the other end edge at C. One side edge of the body portion A is indicated at D and the other side edge at E. The outer face of the body portion A is provided with a pair of spaced transverse lines F, G, which extend from the side edge D and terminate at a point removed from the side edge E. The transverse line G is arranged at a point in proximity to the end edge B but substantially spaced therefrom. The outer face of the body portion A is provided with a pair of spaced transverse lines H, I, which extend from the side edge E of the body portion A and terminate at a point removed from the side edge D. The transverse line H is arranged in proximity to the end edge C but substantially spaced therefrom.

Spaced from the transverse line F is a short transverse line J, and arranged in alignment with respect to the line J as well as being spaced therefrom is a transverse line K, which is spaced from the transverse line F. The inner ends of the lines F, G and K are arranged in alignment.

The body portion A has its outer face further provided with a short transverse line M, which is arranged in alignment with and spaced from a transverse line N. The line M extends from the side edge E, and the lines M and N are spaced from the transverse line I. The inner ends of the lines H, I and N are arranged in alignment.

The outer face of the body portion A is further provided with a series of spaced longitudinally extending lines O, P, Q, R, S and T. The line P is parallel with the line O and said lines O and P extend from the line J and terminate at the end edge C and provide a longitudinally extending space U. The line Q is spaced from the line P and extends from line K to the end edge C, and arranged between the lines P and Q is a short transverse line V. The lines P, Q and V provide a pair of longitudinally extending spaces W, X. The lines S and T are spaced from each other and extend from the line M to the end edge B and from a longitudinally extending space Y. The line R is spaced from the line S and extends from the line N to the end edge B and have arranged therebetween a short transverse line Z. The lines R, S and Z provide a pair of longitudinally extending spaces A', B'. The line N extends from the inner end of the line R to the line Q, and the line K extends from the inner end of the line Q to the line R, and said lines K, N, Q, R provide a centrally arranged rectangular space C'.

Extending from the line G to the end edge B is a series of short longitudinal lines D' providing a transversely extending row of spaces E', preferably seven in number, and each having arranged therein a digit F'. The digit in each space E' is different and the digits are from one to seven.

The lines F, G and R provide a transversely extending space G', opposing the column of spaces E', and within the space G' is a conventional designation H' reading "Twenty points".

The lines J, K, R and F form a transverse space I' provided with an indication J', as shown the number "20."

The longitudinal line O has extending therefrom to the end edge D a series of spaced transversely extending lines K', forming a longitudinal row of spaces L extending from the line J to the end edge C, and each of said spaces is provided with a number L'. The spaces L are nineteen in number and are consecutively numbered "One to nineteen" starting at the space at the end edge C.

The space formed by the lines O, P and J has a conventional designation therein, as at M' and which reads "Hundred points." The space W is provided with an indication N' and such indication is "100." The space X has arranged therein an indication O' and such indication is "300."

Extending from the transverse line H to the end edge C is a series of short longitudinal lines P' providing a transverse row of spaces Q', seven in number, and which are consecutively numbered, as at R' starting from the space Q' at the end edge E, and the numbers in the spaces Q' are from one to seven.

The line Q, in connection with the lines H and I forms a transverse space S', having arranged therein a conventional indication T' reading "Ten points." The line Q in connection with the lines I, M and N forms a transverse space U', having an indication V' arranged therein and such indication is the numeral "10."

Extending from the longitudinal line T to the end edge E is a series of short transverse lines W' providing a longitudinally extending row of spaces X' which are consecutively numbered, as at Y'. The spaces X' are nineteen in number and are numbered one to nineteen, starting from the space X' at the end edge B.

The space Y has arranged therein a suitable designation Z' reading "Fifty points." The space A' has an indication A'' and such indication is numbered "50." The space B' has arranged therein an indication B'' and such indication is "500."

Arranged within the space C' is a conventionally designated line C'' for the reception of the number of the table, a conventionally designated line D'' for the reception of the number of the couple, a conventionally designated line E'' for the reception of the names of the couple, a conventionally designated line F'' for the reception of the date on which the game is played, and a conventionally designated line G'' for the entry of the complete score.

The space W communicates with the space I' and the said spaces W and I' are of the same color but of different color from the spaces X, U and G'.

The space A' communicates with the space U' and said spaces A' and U' are of the same color but of a different color from the spaces S', B' and Y. Preferably the spaces X, U, G', B', Y and S' are white and the spaces W, I', A' and U' are black and with the indications J', N', A'' and V' white so that they will be very distinctive with respect to their spaces. It is to be understood that the colors of the spaces W, I', A', U' can be other than black but of a different color from the spaces X, U, G', B', A' and S', and further that these last mentioned spaces can be of different color than that of white, but they must be of a different color than the spaces W, I', A' and U'.

The body portion A is provided with an aperture or opening H'' for the reception of a cord, string or ribbon, so that the player can detachably secure the card to his person while the game is being played.

The space U' associates with the numbers in the spaces Q'. The space A' associates with the numbers Y' in the spaces X'. The space I' associates with the numbers F' in the spaces E'; and the space W associates with the numbers L' in the spaces L.

When points are made, the number thereof is punched in a space Q', X', E' and L, and when points are lost or a player is set back, the recording is had in one of the spaces U', A', I' or W by punching such space at a point parallel to a number in one of the spaces Q', X', E' or L.

In the spaces Q' and U', the ten points made or lost are recorded. In the spaces A' and X' the fifty points made or lost are recorded. In the spaces E' and I', the twenty points made or lost are recorded. In the spaces L and W, the hundred points made or lost are recorded. To the left of the space W the light rectangular space X having the indication "300" is for easier and speedier punching. To the right of the space A' is the light space B' having the indication "500" and which is provided for easier and speedier punching.

After a game has been played the points lost are subtracted from the points made and which gives the final score, and said final score is recorded at G''.

In playing games where points are made in lower figures than 10, 20, 50, 100 or higher, the cipher may be considered omitted, as for example 10 becomes 1, 20 becomes 2, 50 becomes 5 and 100 becomes 10. By combining figures any desired number may be punched.

When playing games where cards are not used, the opposing players are to be considered as the light or dark opponent, and the score punched in respect to the light or dark spaces.

The score card remains intact except for the punch marks that are made in it, and it may be retained for the individual player as a souvenir, or as a record of ability or skill, or it may be destroyed without great loss.

It is thought that the many advantages of a score card in accordance with this invention can be readily understood, although the preferred embodiment is as illustrated and described, yet it is to be understood that changes in the details of construction can be had which will fall within the light of the invention as claimed.

What I claim is:

1. A score card comprising a body portion having one face provided with means to constitute a value designated elongated points lost narrow scoring space and a row of points made narrow scoring spaces parallel to the points lost scoring space, said body portion further provided with means to form independent spaced value indications for the number of points lost or made, said indications common to the points lost scoring space and the row of points made scoring spaces to designate the score of a player when the points lost or made spaces are separately punched, the points lost scoring space being distinctive from that of the row of points made scoring spaces and of the same length as the length of said row.

2. A score card comprising a body portion having one face provided with means to constitute a plurality of value designated points lost scoring spaces and a plurality of rows of points made narrow scoring spaces, each row of spaces parallel to and of the same length as the length of a points lost narrow scoring space, said body portion further provided with means to form a plurality of sets of independent spaced value indications for the number of points lost or made, each set of spaced indications common to a points lost scoring space and a row of points made scoring spaces to indicate the score of the player when either the said points lost scoring space or one of the spaces of the said row of points made spaces is separately punched, each of the points lost scoring spaces being distinctive from that of the rows of points made scoring spaces.

3. A score card comprising a body portion having one face provided with means to constitute a plurality of value designated points lost scoring spaces and a plurality of rows of points made narrow scoring spaces, each row of spaces parallel to and of the same length as the length of a points lost narrow scoring space, said body portion further provided with means to form a plurality of sets of independent spaced value indications for the number of points lost or made, each set of spaced indications common to a points lost scoring space and a row of points made scoring spaces to indicate the score of the player when either the said points lost scoring space or one of the spaces of the said row of points made spaces is separately punched, each of the points lost scoring spaces being distinctive from that of the rows of points made scoring spaces, and said body portion further provided with conventionally designated means between said points lost scoring spaces for the reception of the name of the player or players and the score.

4. A score card comprising a body portion having one face provided with means to constitute a plurality of value designated points lost scoring spaces and a plurality of rows of points made narrow scoring spaces, each row of spaces parallel to and of the same length as the length of a points lost narrow scoring space, said body portion further provided with means to form a plurality of sets of independent spaced value indications for the number of points lost or made, each set of spaced indications common to a points lost scoring space and a row of points made scoring spaces to indicate the score of the player when either the said points lost scoring space or one of the spaces of the said row of points made spaces is separately punched, each of the points lost scoring spaces being distinctive from that of the rows of points made scoring spaces, one of said points lost scoring spaces and the row of points made scoring spaces arranged parallel therewith being disposed respectively at right angles with respect to one of the other points lost scoring spaces and the row of points made scoring spaces arranged parallel thereto.

5. A score card comprising a body portion having one face provided with means to constitute a plurality of value designated points lost scoring spaces and a plurality of rows of points made narrow scoring spaces, each row of spaces parallel to and of the same length as the length of a points lost narrow scoring space, said body portion further provided with means to form a plurality of sets of independent spaced value indications for the number of points lost or made, each set of spaced indications common to a points lost scoring space and a row of points made scoring spaces to indicate the score of the player when either the said points lost scoring space or one of the spaces of the said row of points made spaces is separately punched, each of the points lost scoring spaces being distinctive from that of the rows of points made scoring spaces, said body portion further provided with conventionally designated means between said points lost scoring spaces for the reception of the name of the player or players and the score, one of said points lost scoring spaces and the row of points made scoring spaces arranged parallel therewith being disposed respectively at right angles with respect to one of the other points lost scoring spaces and the row of points made scoring spaces arranged parallel thereto.

6. A score card comprising a body portion having one face provided with means to constitute a plurality of value designated points lost scoring spaces and a plurality of rows of points made narrow scoring spaces, each row of spaces parallel to and of the same length as the length of a points lost narrow scoring space, said body portion further provided with means to form a plurality of sets of independent spaced value indications for the number of points lost or made, each set of spaced indications common to a points lost scoring space and a row of points made scoring spaces to indicate the score of the player when either the said points lost scoring space or one of the spaces of the said row of points made spaces is separately punched, each of the points lost scoring spaces being distinctive from that of the rows of points made scoring spaces, said points lost scoring spaces and rows of points made scoring spaces extending respectively transversely and longitudinally of said body portion.

In testimony whereof, I affix my signature hereto.

HARRY ANTHONY HAGEN.